July 26, 1949.    J. J. HUMENSKY    2,477,183
PORTABLE BARBECUE EQUIPMENT
Filed April 14, 1948    2 Sheets-Sheet 1
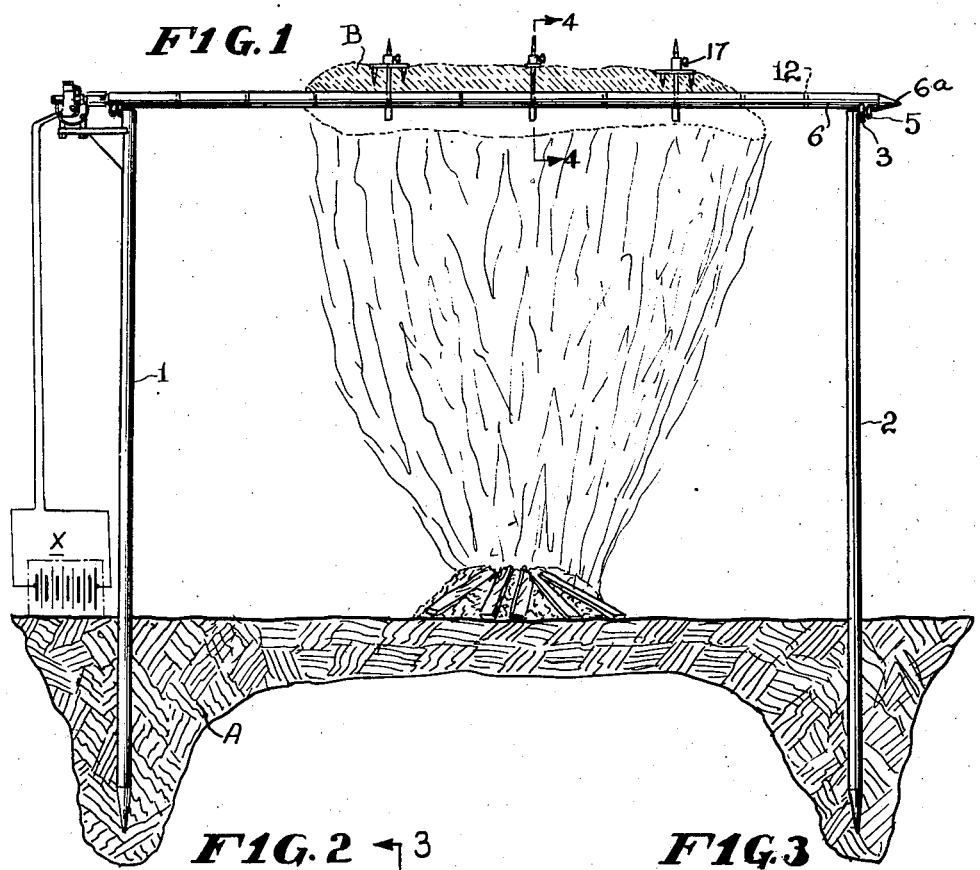
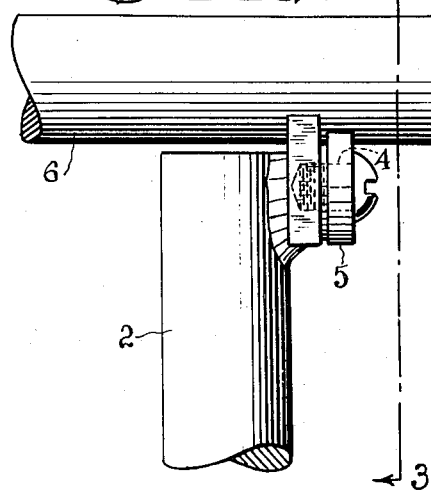
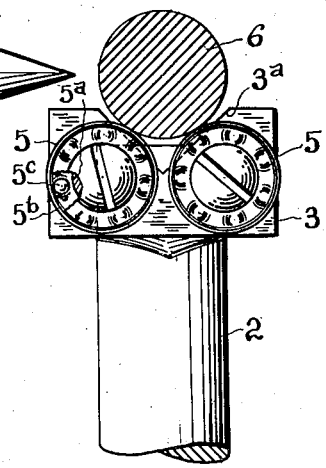
INVENTOR.
JOHN J. HUMENSKY.
BY
Geo. B. Tittle
ATTORNEY

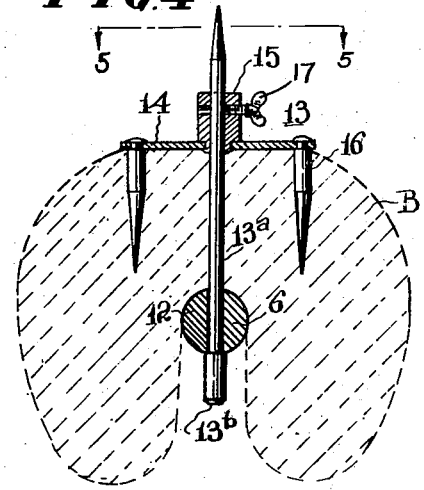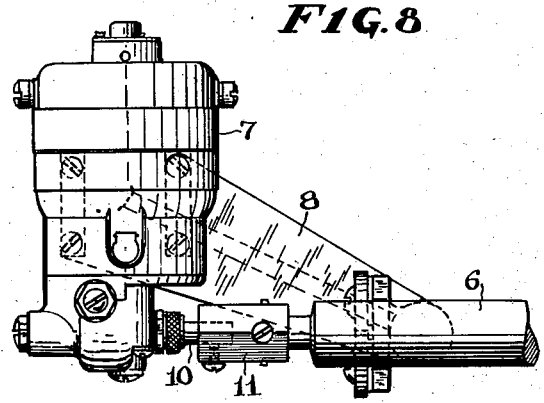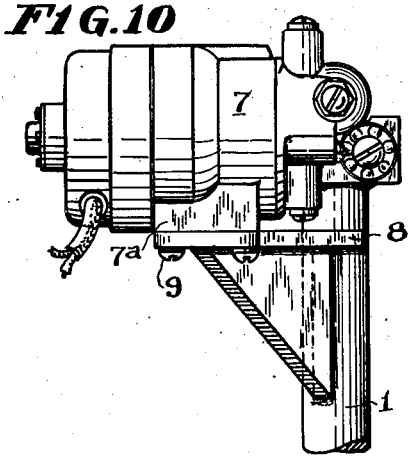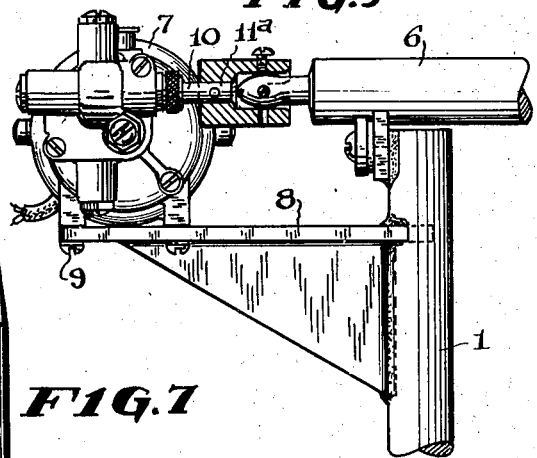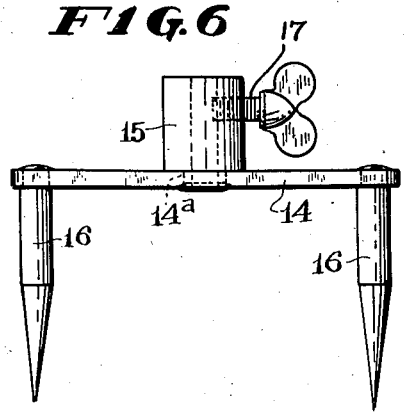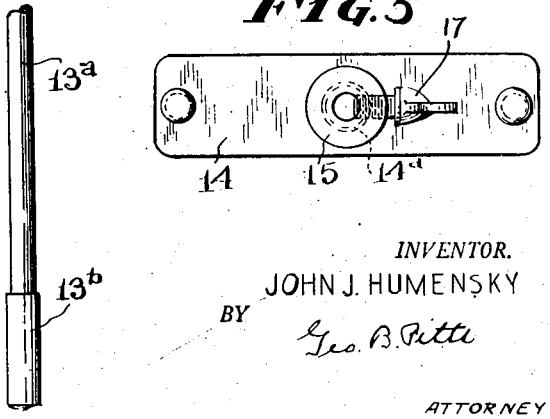
INVENTOR.
JOHN J. HUMENSKY

Patented July 26, 1949

2,477,183

UNITED STATES PATENT OFFICE 2,477,183

PORTABLE BARBECUE EQUIPMENT

John J. Humensky, Cleveland, Ohio

Application April 14, 1948, Serial No. 20,954

2 Claims. (Cl. 99—421)

This invention relates to a portable barbecue equipment adapted for use by picnic or recreational parties, whereby such parties may carry with them complete facilities and stop at desirable locations, whether the latter are provided with heating or cooking devices, such as fireplaces, grills and the like or not.

One object of the invention is to provide an improved equipment of this character of simple construction capable of being readily transported in disassembled condition and easily assembled for use.

Another object of the invention is to provide an improved equipment of this character employing a motor adapted to be readily mounted and detachably connected to the spit for driving the latter at a relatively slow speed.

Another object of the invention is to provide improved equipment of this character having a motor driven spit, the latter being supported and rotatable on pairs of rollers and detachably connected at one end to a shaft driven by the motor to maintain the spit in position, during operation, whereby assembly operations are reduced to a minimum.

Another object of the invention is to provide in equipment of this character improved devices for readily securing the body or bodies of food to be barbecued or broiled in balanced position on the spit.

Another object of the invention is to provide in equipment of this character improved devices for readily securing the body or bodies to be barbecued or broiled in balanced position on the spit consisting of an elongated pin extending diametrically through the spit and body of the food in one direction and a fork-like member the tines of which are adapted to be related to opposite sides of the pin and project into the body of the food in the opposite direction.

Another object of the invention is to provide an improved skewer having a main pin extending diametrically through the spit and body of food in one direction and a pair of supplemental pins fixedly related at opposite sides of and parallel to the main pin and projecting into the body of food in the opposite direction.

Other objects of the invention will be apparent to those skilled in the art to which my invention relates from the following description taken in connection with the accompanying drawings, wherein Fig. 1 is an elevational view of a barbecue equipment embodying my invention, parts being broken away.

Fig. 2 is a fragmentary elevation of parts shown in Fig. 1, enlarged.

Fig. 3 is a section on the line 3—3 of Fig. 2.

Fig. 4 is a section on the line 4—4 of Fig. 1, enlarged.

Fig. 5 is a plan view of parts shown in Fig. 4.

Figs. 6 and 7 are elevational views of the parts forming a skewer.

Fig. 8 is a fragmentary plan view of the motor and its connection with the adjacent end of the spit.

Fig. 9 is a view of the parts shown in Fig. 6 looking upwardly, parts being broken away.

Fig. 10 is an elevational view of the parts shown in Figs. 8 and 9, looking towards the right of Fig. 9.

In the drawings, 1, 2, indicate a pair of spaced uprights having pointed lower ends, whereby they may be readily driven into the ground A. Each upright 1, 2, is provided at its upper end with a transversely disposed support 3, which is preferably welded to one side of the adjacent upright. Each support 3 is provided on its outer face or wall with a pair of spaced stud shafts 4, 4, extending laterally thereof and disposed in a plane at right angles to the adjacent upright and equal distances from a plane extending diametrically of the adjacent upright. The inner end of each stud shaft may be threaded into the support 3, whereby it may be removed. The outer ends of the stud shafts 4, 4, support freely rotatable rollers 5. The stud shafts 4 are so positioned on the support 3 that the peripheries of the rollers extend above the upper end of the adjacent upright, so that the adjacent end portion of a spit 6 may rotatably engage with the rollers. In this arrangement it will be noted that the axis of the spit 6 intersects the axis of the upright, so that the weight of the spit 6 and body of food B thereon is in line with the latter axis. Each roller 5 is of the anti-friction type and consists of an inner race 5a, rotatable on the adjacent shaft, an outer race 5b, which is engaged by the spit 6 and anti-friction elements 5c between the races. The spit 6 consists of a round bar which permits it to be slid endwise on the pairs of rollers 4 and also rotate thereon irrespective of their spaced relation. This arrangement of supporting the spit 6, in addition to reducing friction, eliminates the employment of glands, bolts and other devices and also permits the spit to be readily adjusted endwise irrespective of the spacing of the uprights 1, 2, and its connection with the motor 7. The end of the spit 6 remote from the motor 7 terminates in a conical shaped portion 6a which facilitates projecting the spit through the body of food or portions thereof, when necessary or desirable, assembling each end portion of the spit 6 in engagement with the adjacent rollers 5 and endwise movement of the spit on the pairs of rollers to adjust the body of food relative to the source of heat C or for other reasons. Each support 3 is of a size in width and height to approximate the area occupied by the rollers 5 so that when the uprights are being transported danger of the rollers being damaged is minimized. In this arrangement the upper, central portion of each support 3 is formed with a recess 3a to accommodate the spit 6 and the side walls of the recess provide guards to prevent displacement of the spit.

One of the uprights (upright indicated at 1) is provided with a bracket 8, which is preferably welded thereto to reduce the number of separable parts. The bracket 8 provides a support for the motor 7, the base 7a of the motor being rigidly secured to the bracket 8. The securing means will depend upon the construction of the motor base 7a, but in the illustrated construction such means consist of screws 9 extending through the bracket 8 and threaded into the base 7a. I employ a fractional motor having a gear reduction for the shaft 10 which is provided with a coupler 11 to connect the shaft to the adjacent end of the spit 6. The motor may be supplied with current from a battery X or other source of supply. The coupler 11 is formed with a through opening 11a into which the adjacent ends of the shaft 10 and spit 6 extend for connection therewith. The outer portion of the opening 11a is enlarged and the end of the spit is of curvilinear shape circumferentially and longitudinally to permit a limited universal movement thereof relative to the coupler 11.

The spit 6 is formed with a series of spaced diametrical through openings 12, the corresponding ends of which are in alinement, each opening 12 being adapted to accommodate one element of a skewer, indicated as an entirety at 13. The number of skewers employed will depend on the size and shape of the body of food B and whether more than one body is to be mounted on the spit 6. Each skewer 13 consists of the following: 13a indicates a long main pin having a head 13b at one end and terminating in a conical shaped point at its opposite end. The pin 13a is projected through one of the openings 12 and the body of food B with its head 13b in engagement with the spit. The pin 13a is long enough to project through the body of food B and beyond the upper side thereof. 14 indicates an elongated plate formed with a central opening 14a and provided on one side with a hollow boss 15 alined with the opening 14a to permit the pin 13a to project through the plate and boss. The opposite ends of the plate 14 are provided with parallelly disposed sharp pointed pins 16 rigidly secured to the plate and projecting from the opposite side thereof and arranged to be projected into the body of food B at opposite sides of the main pin 13a, with the plate 14 in engagement with the body of food B. With the pins 13a and 16 in position as shown in Fig. 4, the plate 14 is locked to the pin 13a by a set screw 17 threaded through the side wall of the boss 15. In the arrangement shown, the wall of the opening 12 through which the pin 13a extends and the fixed relation between the pins 16 and pin 13a prevent the latter from swinging about the axis of the spit 6 and as the plate 14 is secured to the pin 13a, the body of food B is immovably connected to the spit 6 for bodily rotation therewith. As many skewers 13 may be used as found necessary to secure the body B, throughout its length to the spit 6.

It will be observed that the plate 14 slidably and rotatably fits the pin 13a to engage bodies of food of different sizes or shapes and may be positioned at different angles relative to the spit 6 so that the pins 16 may be projected into the food body and avoid engagement with bones therein.

It will be observed that the uprights may be spaced apart varying distances and when both uprights are in position in the ground A either one may be rotated to aline the pairs of rollers 5 on both uprights in alinement to accommodate the spit 6.

What I claim is:

1. In a barbecue equipment, the combination of a pair of uprights the lower end portions of which are adapted to be projected into the ground in spaced relation, a pair of rollers supported on the side of each upright adjacent its upper end, a spit engaging said rollers for rotative movement thereon, a motor supported on one of said uprights and drivingly connected to the adjacent end of said spit, said spit being formed intermediate its ends with spaced diametrically extending through openings, and a skewer for securing a body of food on said spit, said skewer consisting of a pin extending through one of said openings and through the body of food, a plate slidably fitting said pin outwardly of the body of food and provided with spaced pins, adapted to be projected into the body of food, and means for securing said plate to said first mentioned pin.

2. A skewer for securing a body of food to a spit consisting of an elongated pin having a head at one end and pointed at its opposite end and adapted to be projected through the spit and body of food thereon in one direction, a plate formed with an opening to slidably and rotatably mount it on said pin and adapted to engage the outer side of the body of food, a hollow boss on the upper side of said plate alined with the opening therethrough, a pair of parallel related spaced pins projecting from the inner side of said plate and adapted to project into the body of food in a direction opposite to that of said first mentioned pin, and a set screw for connecting said boss to said first mentioned pin.

JOHN J. HUMENSKY.

REFERENCES CITED

The following references are of record in the file of this patent:

UNITED STATES PATENTS

| Number | Name | Date |
| --- | --- | --- |
| 1,740,729 | Garvis | Dec. 24, 1929 |
| 2,181,847 | Finizie | Nov. 28, 1939 |
| 2,321,427 | Schelling | June 8, 1943 |
| 2,324,233 | Parsons | July 13, 1943 |
| 2,348,545 | Kahn | May 9, 1944 |
| 2,391,571 | Hennessy | Dec. 25, 1945 |